(12) United States Patent
Beck et al.

(10) Patent No.: US 10,429,832 B2
(45) Date of Patent: Oct. 1, 2019

(54) METHOD FOR THE REMOTE CONTROL OF A FUNCTION OF A MOTOR VEHICLE USING AN ELECTRONIC UNIT OUTSIDE THE VEHICLE, AND A MOTOR VEHICLE

(71) Applicant: VALEO Schalter und Sensoren GmbH, Bietigheim-Bissingen (DE)

(72) Inventors: Manuel Beck, Bietigheim-Bissingen (DE); Frederic Gehin, Bietigheim-Bissingen (DE); Marc Scheerle, Bietigheim-Bissingen (DE); Ullrich Pressel, Bietigheim-Bissingen (DE); Martin Anderschitz, Bietigheim-Bissingen (DE); Viktor Friesen, Bietigheim-Bissingen (DE); Andreas Hiller, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 116 days.

(21) Appl. No.: 15/320,258

(22) PCT Filed: Apr. 20, 2015

(86) PCT No.: PCT/EP2015/058513
§ 371 (c)(1),
(2) Date: Dec. 19, 2016

(87) PCT Pub. No.: WO2015/192996
PCT Pub. Date: Dec. 23, 2015

(65) Prior Publication Data
US 2017/0153635 A1   Jun. 1, 2017

(30) Foreign Application Priority Data

Jun. 18, 2014 (DE) .................. 10 2014 005 796

(51) Int. Cl.
*G05D 1/00* (2006.01)
*G07C 9/00* (2006.01)
*H04L 29/08* (2006.01)

(52) U.S. Cl.
CPC ....... *G05D 1/0011* (2013.01); *G07C 9/00309* (2013.01); *H04L 67/12* (2013.01); *G07C 2009/00507* (2013.01)

(58) Field of Classification Search
CPC .............. G05D 1/0011; G07C 9/00309; G07C 2009/00507; H04L 67/12
See application file for complete search history.

(56) References Cited

U.S. PATENT DOCUMENTS

| 6,570,486 B1 * | 5/2003 | Simon ..................... B60R 25/04 307/10.2 |
| 2002/0178385 A1 * | 11/2002 | Dent .................. G07C 9/00309 726/27 |

(Continued)

FOREIGN PATENT DOCUMENTS

| DE | 10 2012 012389 A1 | 1/2013 |
| EP | 1 043 464 A2 | 10/2000 |

(Continued)

OTHER PUBLICATIONS

Notification of Reasons for Refusal issued in corresponding Japanese Patent Application No. 2016-573970, dated Feb. 27, 2018 (7 pages).

(Continued)

*Primary Examiner* — Courtney D Heinle
(74) *Attorney, Agent, or Firm* — Osha Liang LLP

(57) ABSTRACT

The invention relates to a method for the remote control of a function of a motor vehicle by means of a vehicle-external electronic unit, in which the vehicle-external electronic unit (7) is checked during the driving event of the motor vehicle (1) in that the vehicle-external electronic unit (7) triggers an (Continued)

operation, the result of which is checked for correctness by a control device (3) of the motor vehicle (1). In the method, in which the computing power of the control device as well as the bandwidth of the communication between the vehicle-external electronic unit and the control device are reduced, an index list is stored in the control device (3), wherein, for triggering an operation, an index is transmitted from the control device (3) to the vehicle-external electronic unit (7) and the vehicle-external electronic unit (7) determines by means of the index input variables which are stored in dependence on the index in the vehicle-external electronic unit (7), by means of which the operation is carried out.

8 Claims, 1 Drawing Sheet

(56) References Cited

U.S. PATENT DOCUMENTS

| | | | | |
|---|---|---|---|---|
| 2008/0148369 A1* | 6/2008 | Aaron | ................ | G07C 9/00309 726/5 |
| 2013/0160083 A1* | 6/2013 | Schrix | ................ | G07C 9/00309 726/3 |
| 2015/0137943 A1* | 5/2015 | Nagel | ................ | G07C 9/00309 340/5.72 |

FOREIGN PATENT DOCUMENTS

| | | |
|---|---|---|
| EP | 1 191 486 A1 | 3/2002 |
| EP | 2 320 388 A1 | 5/2011 |
| EP | 2 424 185 A1 | 2/2012 |
| JP | 2002-373320 A | 12/2002 |
| JP | 2009-188512 A | 8/2009 |
| JP | 2010-108054 A | 5/2010 |

OTHER PUBLICATIONS

International Search Report issued in PCT/EP2015/058513, dated Jul. 24, 2015 (3 pages).
Written Opinion of the International Searching Authority issued in PCT/EP2015/058513, dated Jul. 24, 2015 (6 pages).

\* cited by examiner

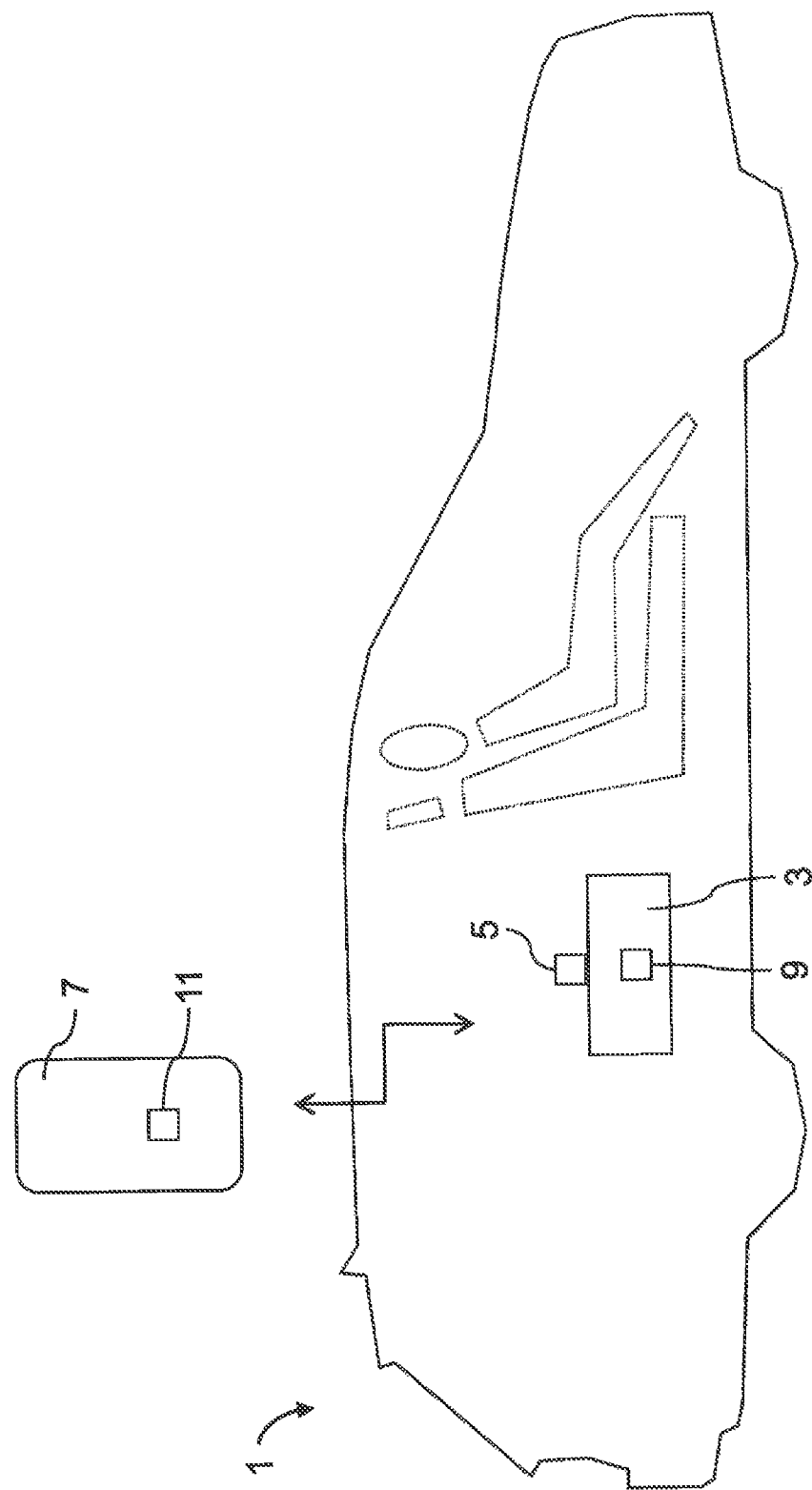

METHOD FOR THE REMOTE CONTROL OF A FUNCTION OF A MOTOR VEHICLE USING AN ELECTRONIC UNIT OUTSIDE THE VEHICLE, AND A MOTOR VEHICLE

The invention relates to a method for the remote control of a function of a motor vehicle by means of a vehicle-external electronic unit, in which the vehicle-external electronic unit is checked during the driving event of the motor vehicle in that the vehicle-external electronic unit triggers an operation, the result of which is checked for correctness by a control device of the motor vehicle.

When using consumer terminals such as, for example, Smartphones, for the remote control of vehicles, the consumer terminal must be monitored during the entire driving process for safety reasons. This occurs in that the consumer terminal executes operations. The input data necessary for the operations are generated by the control device of the motor vehicle. These data are transmitted by the control device to the consumer terminal. The consumer terminal executes the operations and sends the result back to the control device which verifies this. The provision of the input data and verification require a high computing power of the vehicle control device. In addition, a great bandwidth of the communication between the consumer terminal and the control device is necessary because a large number of data are transmitted.

It is the object of the invention to specify a method for the remote control of a function of a motor vehicle by means of a vehicle-external electronic unit in which the computing power of the control device of the motor vehicle or the bandwidth of the communication between the vehicle-external electronic unit and the control device of the motor vehicle are restricted.

The invention results from the features of the independent claims. Advantageous further developments and embodiments are the subject matter of the dependent claims. Further features, possible applications and advantages of the invention are obtained from the subsequent description and the explanation of exemplary embodiments of the invention which are represented in the FIGURES.

The object is achieved by means of the method in that an index list is stored in the control device, wherein, for triggering an operation, an index is transmitted by the control device to the vehicle-external electronic unit and the vehicle-external electronic unit determines by means of the index input variables which are stored in dependence on the index in the vehicle-external electronic unit, by means of which the operation is carried out. The operation is, for example, a mathematical operation. Displacing the input variables into the storage area of the vehicle-external electronic unit leads to the computing power of the control device being restricted. Since only one index has to be transmitted to the vehicle-external electronic unit, the bandwidth of the communication is also restricted. Thus, only a look-up table and indexes are now stored in the control device, the storage area of which is thus significantly reduced. The communication is also reduced from a starting value which, depending on application, can have a size of many bytes (>10 bytes), to a table index which, depending on application, can be represented with distinctly fewer (e.g. 2 bytes). In this context, the size of the index is derived from how many different input variables are needed in order to be able to detect errors reliably.

Advantageously, in the vehicle-external electronic unit, for each index, in addition to the input variables, an expected result of the operation is stored which is transmitted to the control device together with the calculated result. The further storage of the expected result in the vehicle-external electronic unit restricts the computing power and the bandwidth of the communication further. The control device of the motor vehicle only has to compare the two data transmitted by the vehicle-external electronic device, like a calculated result and expected result, and can thus determine the operability of the vehicle-external electronic device in a simple and rapid manner.

In one embodiment, the control device selects an index to be transmitted to the vehicle-external electronic unit by means of a random number generator or from the index list. Using a random number generator increases the safety standard of the vehicle-external electronic unit since it cannot be derived which computing task has to be carried out next by the vehicle-external electronic unit.

The result which is calculated by the vehicle-external electronic unit is checked in the control device of the motor vehicle. In this context, the checking comprises, in particular, its computing unit or memory or software. The checking can be carried out by comparing the data, e.g. the calculated result and the result to be expected. If the calculated result matches the result to be expected, it can be concluded that the electronic unit is operable. Control of the motor vehicle by means of the electronic unit is only enabled in the case of a correct calculation. This makes it possible to guarantee reliable monitoring of the operability of the vehicle-external electronic unit for the remote control of the motor vehicle.

During the calculation of the result by means of the vehicle-external electronic unit, a number of components of the vehicle-external electronic unit are required and correspondingly utilized. This is used for testing the components of the vehicle-external electronic unit involved for their reliability. The performance of the checking requires at least a selection of the following components: e.g. processor corals, cache memory, RAM, ROM, flash-EPROM, monitor controller, input controller. Further components of the respective vehicle-external electronic unit can also be involved.

In addition, the index table can be updated, e.g. during software updates. This makes it possible to guarantee the safety over a relatively long period.

A further development of the invention relates to a motor vehicle having a control device which communicates with a vehicle-external electronic unit and monitors the operation of the vehicle-external electronic unit during the driving operation, in that an operation is triggered by the control device in the vehicle-external electronic unit, the result of which is transmitted by the vehicle-external electronic unit to the control device. In the case of a motor vehicle in which the computing power of a control device and also the bandwidth of the communication between a control device and the vehicle-external electronic unit is reduced, in the control device, an index list in the form of a look-up table is stored, wherein, for triggering the operation, an index can be transmitted from the control device to the vehicle-external electronic unit as a result of which the vehicle-external electronic unit determines by means of the index input variables which are stored in dependence on the index in the vehicle-external electronic unit, by means of which the operation can be carried out. This has the advantage that the pure selection of indices by the control device minimizes the computing power and the memory requirement of the control device in the motor vehicle.

Further advantages, features and details are found in the subsequent description in which—possibly with reference to the drawing—at least one exemplary embodiment is described in detail. Features described and/or represented as images can form the subject matter of the invention by themselves or in arbitrary, meaningful combination, possibly also independently of the claims, and can additionally also be especially the subject matter of one or more separate application's. Identical, similar and/or functionally equal parts are provided with the same reference symbols.

Shown are, in:

FIG. 1 an exemplary embodiment of a motor vehicle for carrying out the method according to the invention.

FIG. 1 shows a motor vehicle 1 which has a control device 3 which communicates via a communication interface 5 with a vehicle-external electronic unit, for example a Smartphone 7. This Smartphone 7 is used in this context for opening and closing the motor vehicle 1. After a signal of the Smartphone 7 in which coding is sent to the control device 3 from the Smartphone 7, the control device 3 compares the coding transmitted by the Smartphone 7 with a predetermined coding and switches an actuator of a vehicle closing system when these two codings match.

In order to ensure that the Smartphone 7 also always operates correctly, the operation of the Smartphone 7 must be checked during the entire driving operation. For this purpose, a look-up table is stored in the Smartphone 7 which has in each case input variables corresponding to the index for an operation and the expected result of the operation. In a memory 9 of the control device 3, a look-up table is also stored which, however, only contains the indices. The size of the index is derived from how many different input variables are needed in order to reliably detect errors.

If then the control device 3 intends to check the operability of the Smartphone 7, it selects, by random number generator, an index from the list of indices which is stored in its memory 9. This index is sent wirelessly to the Smartphone 7 via the communication interface 5. After receiving this index, the Smartphone 7 reads from its memory 11 the input variables belonging to this index and carries out the operation. Subsequently, the Smartphone 7 sends the calculated results of its operation together with the stored result to be expected back to the control device 3. The control device 3 compares these two results. When the expected result and the calculated result match, it can be assumed that the Smartphone 7 is operating properly and can therefore continue to be used for opening and closing or controlling the motor vehicle.

Although the invention has been illustrated and explained in detail by preferred exemplary embodiments, the invention is not restricted by the disclosed examples and other variations can be derived therefrom by the expert without departing from the protective cover of the invention. It is clear, therefore, that a multiplicity of possible variations exist. It is also clear that embodiments mentioned by way of example only represent examples which are not to be considered in any way as limiting the protective range, the possible applications or the configuration of the invention. Instead, the preceding description and the description of the FIGURES enable the expert to implement the exemplary embodiments in concrete form, the expert, knowing the disclosed concept of the invention, being able to carry out various changes, for example with regard to the operation or the arrangement of individual elements mentioned in an exemplary embodiment, without departing from the scope of protection which is defined by the claims and their legal equivalents such as, for instance, further explanation in the description.

LIST OF REFERENCE DESIGNATIONS

1 Motor vehicle
3 Control device
5 Communication interface
7 Smartphone or external electronic unit
9 Memory
11 Memory

The invention claimed is:

1. A method for the remote control of a function of a motor vehicle by a vehicle-external electronic unit, in which the vehicle-external electronic unit is checked during the driving event of the motor vehicle in that the vehicle-external electronic unit triggers a mathematical operation, the result of which is checked for correctness by a control device of the motor vehicle,
   storing, in the control device, a look-up table comprising an index list;
   for triggering the mathematical operation in the vehicle-external electronic unit, transmitting an index by the control device to the vehicle-external electronic unit; and
   determining, by the vehicle-external electronic unit using the index as an input variable to the look-up table, which operation is carried out by the motor vehicle, wherein the index list is stored in dependence on the index in the look-up table, by means of which the mathematical operation is carried out.

2. The method according to claim 1, characterized in that in the vehicle-external electronic unit, for each index, in addition to the input variables, an expected result of the mathematical operation is stored which is transmitted to the control device together with the calculated result.

3. The method according to claim 1, characterized in that the control device selects from the index list an index to be transmitted to the vehicle-external electronic unit by means of a random number generator.

4. The method according to claim 1, characterized in that a check of the result which is calculated by the vehicle-external electronic unit is performed in the motor vehicle and control of the motor vehicle by means of the electronic unit is only enabled in the case of a correct calculation.

5. The method according to claim 1, wherein during the calculation of the result, different components of the electronic unit are required and utilized.

6. The method according to claim 1, wherein the index list is updated.

7. The method according to claim 1, wherein the control device transmits a plurality of indexes to check the vehicle-external electronic unit during an entire driving operation of the motor vehicle.

8. A motor vehicle comprising:
   a control device which communicates with a vehicle-external electronic unit and monitors a mathematical operation of the vehicle-external electronic unit during a driving operation,
   wherein the control device is external to the vehicle-external electronic unit,
   wherein the mathematical operation is triggered by the control device in the vehicle-external electronic unit, and a result of the mathematical operation is transmitted by the vehicle-external electronic unit to the control device,
   wherein, in the control device, an index list in the form of a look-up table is stored, wherein, for triggering the mathematical operation in the vehicle-external electronic unit, an index is transmitted from the control device to the vehicle-external electronic unit, as a result of which the vehicle-external electronic unit determines, using the index as an input variable to the look-up table, which operation is carried out by the motor vehicle, wherein the index list is stored in dependence on the index in the vehicle-external electronic unit and by which the mathematical operation can be carried out.

* * * * *